(12) United States Patent
Payne et al.

(10) Patent No.: US 7,615,269 B2
(45) Date of Patent: Nov. 10, 2009

(54) ADSORBENT COMPOSITIONS

(75) Inventors: David S. Payne, West Seneca, NY (US); Thomas H. Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 978 days.

(21) Appl. No.: 10/122,577

(22) Filed: Apr. 15, 2002

(65) Prior Publication Data

US 2003/0194516 A1 Oct. 16, 2003

(51) Int. Cl.
*B29D 22/00* (2006.01)
*B29D 23/00* (2006.01)
*B32B 1/08* (2006.01)
*B32B 27/32* (2006.01)

(52) U.S. Cl. ............... 428/35.2; 428/34.1; 428/35.6; 96/118; 96/154

(58) Field of Classification Search ............... 428/35.7, 428/34.1; 252/184, 190, 192, 194; 604/367, 604/374; 96/118, 154
See application file for complete search history.

(56) References Cited

U.S. PATENT DOCUMENTS

| | | | |
|---|---|---|---|
| 3,923,944 A | | 12/1975 | Clark |
| 4,259,383 A | * | 3/1981 | Eggensperger et al. ........ 428/72 |
| 4,485,133 A | | 11/1984 | Ohtsuka et al. |
| 4,487,791 A | | 12/1984 | Komatsu et al. |
| 4,749,388 A | * | 6/1988 | Francois |
| 4,749,392 A | * | 6/1988 | Aoki et al. ...................... 96/6 |
| 4,973,448 A | * | 11/1990 | Carlson et al. |
| 5,372,429 A | * | 12/1994 | Beaver et al. ................ 383/109 |
| 5,743,942 A | * | 4/1998 | Shelley et al. ................. 96/118 |
| 5,773,105 A | | 6/1998 | Klett |
| 5,817,381 A | * | 10/1998 | Chen et al. ................. 428/34.8 |
| 6,235,219 B1 | | 5/2001 | Beckenhauer |
| 6,649,086 B2 | * | 11/2003 | Payne et al. ................. 252/194 |
| 2002/0035354 A1 | * | 3/2002 | Mirle et al. |

FOREIGN PATENT DOCUMENTS

| | | | |
|---|---|---|---|
| DE | 19618444 A1 | * | 11/1997 |
| EP | 0 793 992 A2 | | 9/1997 |
| EP | 0 793 992 A3 | | 11/1997 |
| EP | 0 831 033 A1 | | 3/1998 |
| JP | 58219919 | | 12/1983 |
| JP | 62242616 A | * | 10/1987 |
| JP | 03169322 | | 7/1991 |

(Continued)

OTHER PUBLICATIONS

M. Webster's Collegiate Dictionary, 10th ED. ( © 1999),p. 161.*

(Continued)

*Primary Examiner*—Michael C Miggins
(74) *Attorney, Agent, or Firm*—Stephen B. Salai, Esq.; Paul A. Leipold, Esq.; Harter Secrest & Emery LLP

(57) ABSTRACT

A water vapor adsorption and water retaining composition containing particulate calcium chloride and cellulose fiber in a flexible container having a side of spun-bonded polyethylene heat sealed to a side of extrusion coated polyethylene on polyester. The foregoing composition can also contain clay.

24 Claims, 2 Drawing Sheets

FOREIGN PATENT DOCUMENTS

| | | | |
|---|---|---|---|
| JP | 2000005553 | | 1/2000 |
| RU | 1807036 A1 | * | 4/1993 |

OTHER PUBLICATIONS

"Drying component—comprising deliquescent salts, water-absorbing synthetic resin and water holding material e.g. zeolite".
Derwent, Sep. 26, 1986 XP002241652 *abstract*.
"Non-bulky moisture absorbent—comprises inorganic cpd. e.g. calcium chloride, and water retaining agent composed of moisture-absorptive and porous grains".
Derwent, Aug. 31, 1993, XP002241653 *abstract*.
"Hygroscopic agent compsn.—comprising calcium chloride, inorganic mineral and oxides".
Derwent, Mar. 23, 1994, XP002241655 *abstract*.
"Moulded desiccating agent—contains highly hydroscopic synthetic resin and deliquescent salt".
Derwent, Jun. 28, 1986 XP002207362 *abstract*.
Derwent-ACC-No. 1993-308422—dated 1993.
Derwent-ACC-No. 1984-261038—dated 1984.
Derwent-ACC-No. 1983-26335K—dated 1983.
JP Abstract Pub-No. JP358219919A—dated 1983.
JP Abstract Pub-No. JP362117614A—dated 1987.

* cited by examiner

ADSORBENT COMPOSITIONS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to improved water vapor adsorption and water retaining compositions.

By way of background, there are situations wherein products must be protected from moisture in environments wherein there are wide swings in temperature and relative humidity.

BRIEF SUMMARY OF THE INVENTION

It is one object of the present invention to provide improved water vapor adsorption and water retaining compositions which will operate well under conditions of wide swings in temperature and relative humidity.

Another object of the present invention is to provide improved water vapor adsorption and water retaining compositions which will adsorb water vapor and will retain the adsorbed water without appreciably increasing the volume of the composition.

A further object of the present invention is to provide improved water vapor adsorption and water retaining compositions containing water retaining material which will hold a high multiple of its weight of water. Other objects and attendant advantages of the present invention will readily be perceived hereafter.

The present invention relates to a water vapor adsorption and water retaining composition comprising particulate calcium chloride and particulate cellulose fiber.

The present invention also relates to a water vapor adsorbing and water retaining composition comprising calcium chloride, cellulose fiber and clay.

The present invention also relates to a water vapor adsorption and water retaining composition comprising particulate calcium chloride and cellulose fiber in a flexible container having a side of spun-bonded polyethylene and a side of extrusion coated polyethylene on polyester.

The present invention also relates to a water vapor absorbing and water retaining composition comprising particulate calcium chloride, cellulose fiber and clay in a flexible container comprising a side of spun-bonded polyethylene and a side of extrusion coated polyethylene on polyester.

The various aspects of the present invention will be more fully understood when it is considered in combination with the following drawings wherein:

DETAILED DESCRIPTION OF THE INVENTION

The preferred embodiment of the improved water vapor adsorption and water retaining composition of the present invention comprises particulate calcium chloride C and particulate corn cellulose fiber F. However, as will appear hereafter, other types of cellulose fiber can also be used. The calcium chloride is a deliquescent which has a high affinity for water vapor and therefore works well under conditions of wide swings in temperature and relative humidity. The calcium chloride and particulate corn cellulose fiber have the capacity of absorbing and retaining approximately 2½ times its weight of water without expanding appreciably.

Figure 5:
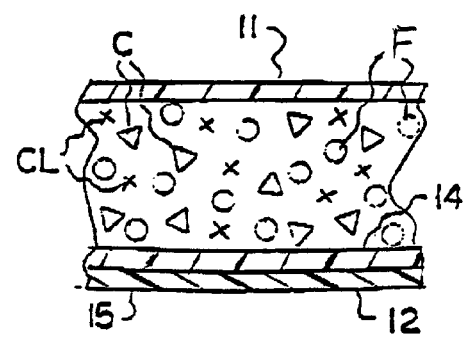
FIG. 5 is a view similar to FIG. 4 but showing the container of FIG. 1 containing the composition of calcium chloride, cellulose fiber and clay of the present invention.
Figure 4:
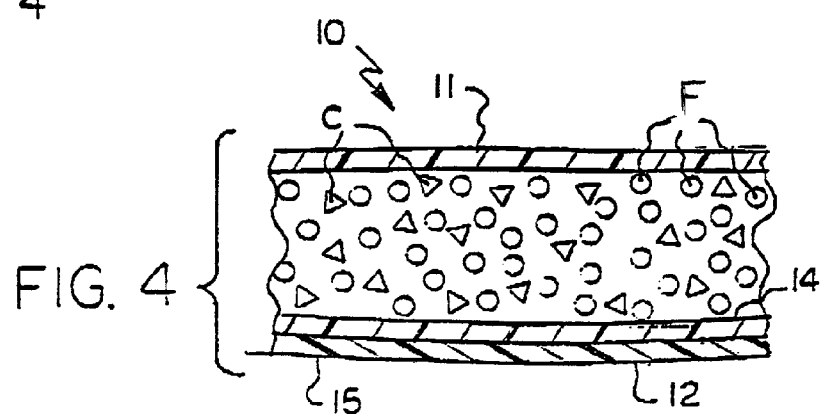
FIG. 4 is a fragmentary enlarged cross sectional view taken substantially along line 4-4 of FIG. 2.

Another embodiment of the present invention (FIG. 5) comprises calcium chloride C, corn cellulose fiber F and clay CL. The combination of calcium chloride, corn cellulose fiber and clay has the capacity of absorbing and retaining approximately 1½ times its weight of water.

In the calcium chloride and corn cellulose fiber composition, the calcium chloride may be present in an amount by weight of between about 5% and 90% and more preferably between about 15% and 75% and most preferably between about 35% and 55%.

The particulate calcium chloride is preferably of a mix having particles of between about 0.6 mm and 4.7 mm. However, the size is not critical inasmuch as the calcium chloride deliquesces into a syrupy solution and therefore any reasonable size is acceptable.

In the calcium chloride and corn cellulose fiber composition, the corn cellulose fiber may be present in an amount by weight of between about 20% and 95% and more preferably between about 30% and 80% and most preferably between about 50% and 70%.

The particulate corn cellulose fiber is preferably of a size of between about 0.6 mm and 2 mm.

The composition of calcium chloride and corn cellulose fiber is produced by mixing the foregoing components in the desired relatively sufficient proportions.

In the calcium chloride, corn cellulose fiber and clay composition, the calcium chloride may be present in an amount by weight of between about 5% and 95% and more preferably between about 10% and 50% and most preferably between about 15% and 25%.

In the calcium chloride, corn cellulose fiber and clay composition, the corn cellulose fiber may be present in an amount by weight of between about 30% and 90% and more preferably between about 40% and 80% and most preferably between about 50% and 70%.

In the calcium chloride, corn cellulose fiber and clay composition, the clay may be present in an amount by weight of between about 5% and 95% and more preferably between about 10% and 50% and most preferably between about 15% and 25%.

The preferred clay is a bentonite type of clay. However, any suitable clay including but not limited to attapulgite and montmorillonite clay may be used.

The clay may be of a particle size of between about 0.5 inch and 200 mesh and more preferably between about 0.25 inch and 50 mesh and most preferably between about 4 mesh and 40 mesh.

In the calcium chloride, corn cellulose fiber and clay composition, the corn cellulose fiber and calcium chloride may be of the sizes discussed above relative to the calcium chloride and corn cellulose fiber composition.

The composition of calcium chloride, corn cellulose fiber and clay is produced by mixing the foregoing components in the desired relatively sufficient proportions.

As can be seen from a comparison of the amount of calcium chloride in the calcium chloride and corn cellulose fiber composition with an amount of the calcium chloride in the calcium chloride, corn cellulose fiber and clay composition, the latter is a much smaller percentage of the total weight of the composition. This makes the latter more suitable for use in environments where the corrosive tendency of the calcium chloride should be minimized. Yet, the smaller amount of calcium chloride still provides an excellent amount of water absorption.

The illustrated flexible container 10 is fabricated of two sides of flexible sheet material and is approximately 10 inches long, 7 inches wide and about 1½ inches thick at its midpoint when it is filled with each of the above compositions. The dimensions include a ½ inch heat-sealed border on all four sides. The container has a side 11 of spun-bonded polyethylene having a thickness of 6.5 mils known under the registered trademark TYVEK which is a product of E. I. DuPont de Nemours & Co. and has a designation 1059B. The other side 12 is an extrusion coated composite having an extrusion coating 14 of 0.0020 inches of polyethylene on a base 15 of 0.00048 inches of polyester. This is a commercially obtainable product from Rollprint Packaging Products, Inc., and it has a designation of RP0025. The polyethylene 11 is sealed to the polyethylene 14. The container 10 having an extrusion coated composite 12 is advantageous over prior flexible containers having a side which is an adhesive-bonded laminate because the adhesive has been eliminated and therefore need not be taken into consideration relative to the possibility of melting which could lead to delamination or otherwise degrading during a heat-sealing operation.

Figure 1:
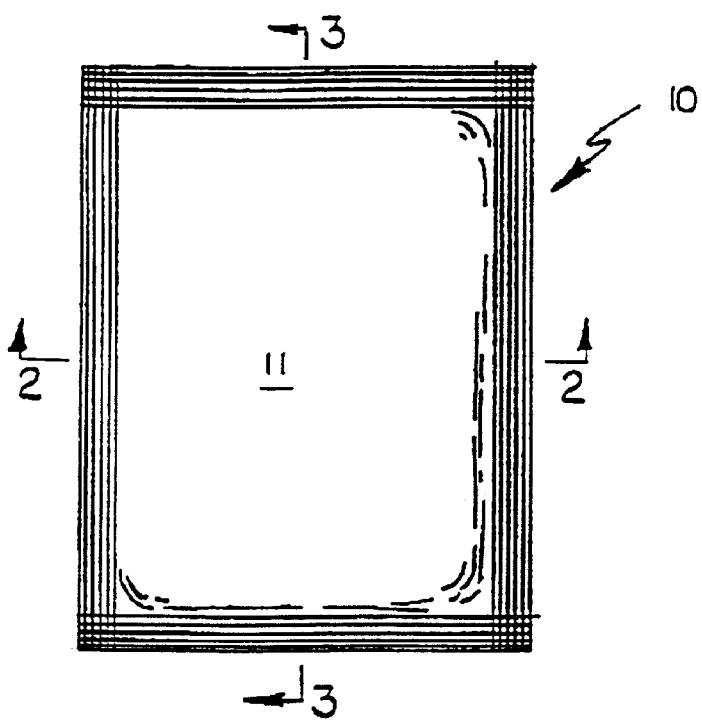
FIG. 1 is a plan view of a container containing the improved water vapor adsorption and water retaining composition of calcium chloride and cellulose fiber of the present invention.
Figure 3:
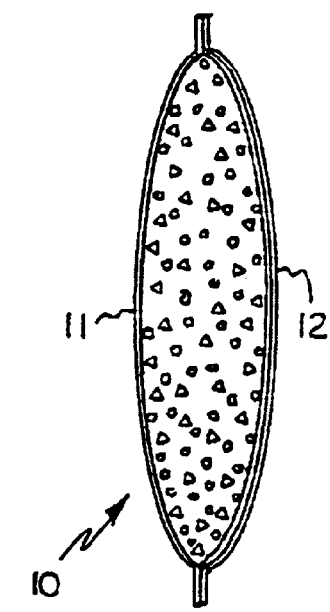
FIG. 3 is a cross sectional view taken substantially along line 3-3 of FIG. 1.
Figure 2:
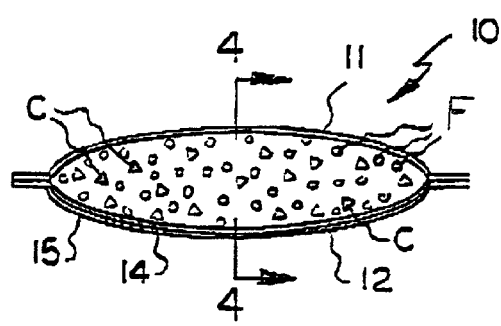
FIG. 2 is a cross sectional view taken substantially along line 2-2 of FIG. 1.

In a preferred embodiment of the calcium chloride and corn cellulose fiber composition, the container 10 of FIG. 1 contains 85 grams of calcium chloride and 100 grams of corn cellulose fiber. The volume of calcium chloride is approximately 86 cc and the volume of the corn cellulose fiber is approximately 255 cc. The 100 grams of corn cellulose fiber will absorb approximately 450 grams of liquid water which it receives in the form of a calcium chloride solution. In the preferred embodiment, the calcium chloride is present by weight in an amount of 46% and the corn cellulose fiber is present by weight in an amount of 54%. The corn cellulose fiber is of a mix having a size range of between about 0.6 mm and 2 mm. The calcium chloride, as noted above, is of a mix having a size range of between about 0.6 mm to 4.7 mm.

In a preferred embodiment of the calcium chloride, corn cellulose fiber and clay composition, the container 10 of FIG. 1 contains 35 grams of calcium chloride and 115 grams of corn cellulose fiber and 35 grams of bentonite type clay. The volume of calcium chloride is approximately 36 cc and the volume of the corn cellulose fiber is approximately 290 cc and the volume of the clay is approximately 50 cc. The 150 grams of corn cellulose fiber and clay will absorb and retain approximately 253 grams of liquid water which it receives in the form of a calcium chloride solution. In the preferred embodiment, the calcium chloride is present by weight in an amount of 19% and the corn cellulose fiber is present by weight in an amount of 62% and the clay is present by weight in an amount of 19%. The corn cellulose fiber is of a mix having a size range of between about 0.6 mm and 2 mm. The calcium chloride, as noted above, is of a mix having a size range of between about 0.6 mm to 4.7 mm and the clay is a mix having a size range of between about 4 mesh and 40 mesh.

Figure 6:
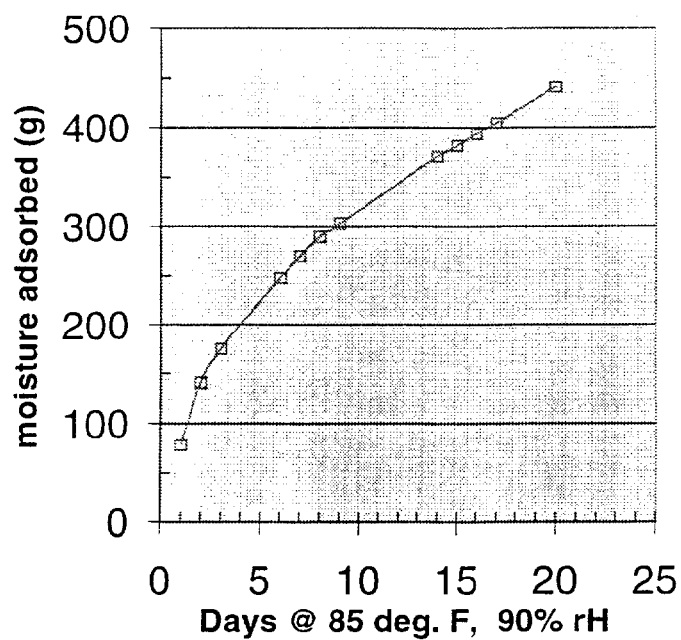
FIG. 6 is a graph of a composition of calcium chloride and cellulose fiber functioning under the conditions stated thereon.

The characteristics of the above described composition having 85 grams of calcium chloride and 100 grams of corn cellulose fiber is shown in the graph of FIG. 6 which plots moisture adsorbed in grams against days at 85° F. and 90% relative humidity. It can be seen from the graph of FIG. 6 that the sample having a combined weight of 185 grams (85 grams of calcium chloride and 100 grams of corn cellulose fiber) will continuously adsorb and retain liquid water, and the amount at the end of about 20 days is approximately 450 grams of water, and the curve is still rising.

Figure 7:
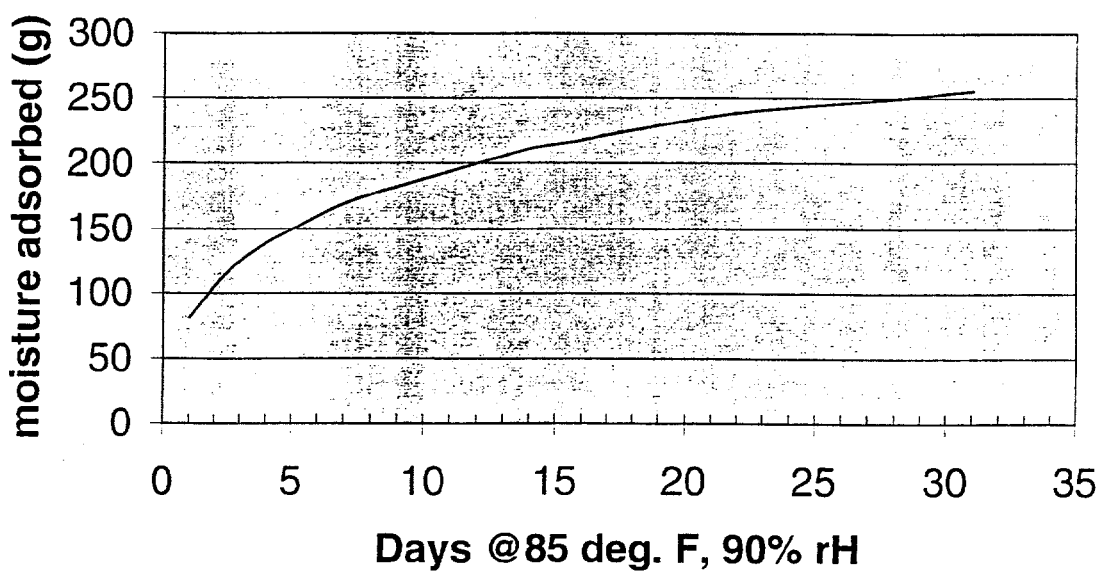
FIG. 7 is a graph of a composition of calcium chloride, cellulose fiber and clay functioning under the conditions stated thereon.

The characteristics of the above described composition having 35 grams of calcium chloride, 115 grams of corn cellulose fiber and 35 grams of clay is shown in the graph of FIG. 7 which plots moisture adsorbed in grams against days at 85° F. and 90% relative humidity. It can be seen from the graph of FIG. 7 that the sample having a combined weight of 185 grams (35 grams of calcium chloride, 115 grams of corn cellulose fiber and 35 grams of clay) will continuously adsorb and retain 253 grams of liquid water over a 30-day period.

Examples of a composition of calcium chloride and wood based cellulose fiber are set forth hereafter. Twelve grams of a composition consisting of 25% calcium chloride and 75% wood based cellulose fiber obtainable under the trademark SOLKA FLOC of Fiber Sales & Development was exposed to a temperature of 100° F. and 90% relative humidity for fourteen days and it absorbed 21 grams of water.

In another example, twelve grams of a composition consisting of 42% calcium chloride and 58% wood based cellulose fiber obtainable under the trademark SOLKA FLOC was exposed to the same conditions as in the preceding example and it absorbed 36 grams of water.

The above noted composition of wood based cellulose fiber and calcium chloride may also have clay added thereto as discussed above relative to the calcium chloride and corn cellulose fiber, and the clay can be in the same proportions as discussed above relative to the corn cellulose and calcium chloride and clay composition.

While the above description has been specific to corn cellulose fiber and wood based cellulose fiber, it will be appreciated that the wood based cellulose fiber and any other type of cellulose fiber including but not limited to wheat cellulose fiber and rice cellulose fiber and other plant cellulose fibers may be used in the same proportions with the calcium chloride and with the calcium chloride and clay as noted above for the corn cellulose fiber.

While the above description has referred to a composition as consisting essentially of calcium chloride and corn cellulose fiber and another composition consisting essentially of calcium chloride, corn cellulose fiber and clay, and to a composition consisting essentially of calcium chloride and wood based cellulose fiber, it will be appreciated that minor components may be added for specific purposes which do not appreciably alter the basic water-vapor adsorption and water retaining characteristics of the above-described compositions. Such minor components may include preservatives, biocides, germicides, fungicides, etc. for the purpose of preventing growth of undesirable organisms.

While preferred embodiments of the present invention have been disclosed, it is to be understood that it is not limited thereto but may be otherwise embodied within the scope of the following claims.

The invention claimed is:

1. A water vapor adsorption and water retaining composition comprising particulate calcium chloride and particulate cellulose fiber, wherein said calcium chloride is present by weight in an amount of between about 5% and 90%, wherein said cellulose fiber is present in an amount of between about 20% and 95%, and wherein said calcium chloride is of a size of between about 0.6 mm and 4.7 mm.

2. A composition as set forth in claim 1 wherein said cellulose fiber is of a size of between about 0.6 mm and 2 mm.

3. A composition as set forth in claim 1 wherein said calcium chloride is present by weight in an amount of about 46% and said cellulose fiber is present in an amount of about 54%.

4. A composition as set forth in claim 1 wherein said calcium chloride is present by weight in an amount of between about 15% and 75% and wherein said cellulose fiber is present in an amount of between about 30% and 80%.

5. A composition as set forth in claim 4 wherein said cellulose fiber is of a size of between about 0.6 mm and 2 mm.

6. A composition as set forth in claim 1 wherein said calcium chloride is present by weight in an amount of between about 35% and 55% and wherein said cellulose fiber is present in an amount of between about 50% and 70%.

7. A composition as set forth in claim 6 wherein said cellulose fiber is of a size of between about 0.6 mm and 2 mm.

8. A water vapor adsorption and water retaining composition consisting essentially of particulate calcium chloride and particulate cellulose fiber, wherein said composition is in a water vapor permeable container comprising a flexible container having a side of spun-bonded polyethylene and a side of extrusion coated polyethylene on polyester wherein the side of extrusion coated polyethylene is on the inside of the container.

9. A water vapor adsorption and water retaining composition consisting essentially of particulate calcium chloride, particulate cellulose fiber and clay in a water vapor permeable container, wherein said composition is in a water vapor permeable container comprising a flexible container having a side of spun-bonded polyethylene and a side of extrusion coated polyethylene on polyester, wherein the side of extrusion coated polyethylene is on the inside of the container.

10. A water vapor permeable container containing a water vapor adsorbing and liquid water retaining composition comprising particulate calcium chloride and particulate cellulose fiber, wherein said calcium chloride is present by weight in an amount of between about 5% and 90% and wherein said cellulose fiber is present in an amount of between about 20% and 95%, and wherein said calcium chloride is of a size of between about 0.6 mm and 4.7 mm.

11. A water vapor permeable container as set forth in claim 10 wherein said cellulose fiber is of a size of between about 0.6 mm and 2 mm.

12. A water vapor permeable container as set forth in claim 10 wherein said calcium chloride is present by weight in an amount of between about 15% and 75% and wherein said cellulose fiber is present in an amount of between about 30% and 80% and wherein said cellulose fiber is of a size of between about 0.6 mm and 2 mm.

13. A water vapor permeable container as set forth in claim 10 wherein said calcium chloride is present by weight in an amount of about 46% and said cellulose fiber is present in an amount of about 54%.

14. The vapor permeable container of claim 10 wherein said water vapor permeable container comprises a flexible container having a side of spun-bonded polyethylene and a side of extrusion coated polyethylene on polyester, wherein the side of extrusion coated polyethylene is on the inside of the container.

15. A water vapor permeable container as set forth in claim 10 wherein said calcium chloride is present by weight in an amount of between about 35% and 55% and wherein said cellulose fiber is present in an amount of between about 50% and 70%.

16. A water vapor permeable container as set forth in claim 15 wherein said cellulose fiber is of a size of between about 0.6 mm and 2 mm.

17. A water vapor permeable container containing a water vapor adsorbing and liquid water retaining composition consisting essentially of particulate calcium chloride and particulate cellulose fiber in a water vapor permeable container wherein said water vapor permeable container comprises a flexible container having a side of spun-bonded polyethylene and a side of extrusion coated polyethylene on polyester, wherein the extrusion coated polyethylene is on the inside of said container.

18. A water vapor permeable container as set forth in claim 17 wherein said calcium chloride is present by weight in an amount of about 46% and said cellulose fiber is present in an amount of about 54%.

19. A water vapor permeable container as set forth in claim 17 wherein said calcium chloride is present by weight in an amount of between about 5% and 90% and wherein said cellulose fiber is present in an amount of between about 20% and 95%.

20. A water vapor permeable container as set forth in claim 19 wherein said calcium chloride is of a size of between about 0.6 mm and 4.7 mm and wherein said cellulose fiber is of a size of between about 0.6 mm and 2 mm.

21. A water vapor permeable container as set forth in claim 17 wherein said calcium chloride is present by weight in an amount of between about 15% and 75% and wherein said cellulose fiber is present in an amount of between about 30% and 80%.

22. A water vapor permeable container as set forth in claim 21 wherein said cellulose fiber is of a size of between about 0.6 mm and 2 mm.

23. A water vapor permeable container as set forth in claim 17 wherein said calcium chloride is present by weight in an amount of between about 35% and 55% and wherein said cellulose fiber is present in an amount of between about 50% and 70%.

24. A water vapor permeable container as set forth in claim 23 wherein said cellulose fiber is of a size of between about 0.6 mm and 2 mm.

* * * * *